(12) United States Patent
Kogge et al.

(10) Patent No.: US 9,417,805 B2
(45) Date of Patent: Aug. 16, 2016

(54) EXPORTING COMPUTATIONAL CAPABILITIES INTO A BLOCK-ORIENTED DISK MEMORY

(71) Applicant: Emu Solutions, Inc., South Bend, IN (US)

(72) Inventors: Peter M. Kogge, Granger, IN (US); Edwin T. Upchurch, Austin, TX (US)

(73) Assignee: EMU SOLUTIONS, INC., South Bend, IN (US)

( * ) Notice: Subject to any disclaimer, the term of this patent is extended or adjusted under 35 U.S.C. 154(b) by 42 days.

(21) Appl. No.: 14/541,838

(22) Filed: Nov. 14, 2014

(65) Prior Publication Data

US 2015/0143036 A1    May 21, 2015

Related U.S. Application Data

(60) Provisional application No. 61/906,067, filed on Nov. 19, 2013.

(51) Int. Cl.
*G06F 3/06*    (2006.01)

(52) U.S. Cl.
CPC ............ *G06F 3/0619* (2013.01); *G06F 3/0659* (2013.01); *G06F 3/0665* (2013.01); *G06F 3/0679* (2013.01); *G06F 3/0689* (2013.01)

(58) Field of Classification Search
None
See application file for complete search history.

(56) References Cited

U.S. PATENT DOCUMENTS 7,185,150 B1    2/2007 Kogge

OTHER PUBLICATIONS

Van Essen, et al., "DI-MMAP: A High Performance Memory-Map Runtime for Data-Intensive Applications," High Performance Computer, Storage & Analysis (SCC), 2012 Companion; pp. 731, 735, 10-16 (Nov. 2012).

Seung, et al., "Energy Savings through Embedded Processing on Disk Systems," Proceedings of the 2006 Asia and South Pacific Design Automation Conference (ASP-DAC '06); IEEE Press, 128-133 (2006).

*Primary Examiner* — Kevin Verbrugge
(74) *Attorney, Agent, or Firm* — Gesmer Updegrove LLP

(57) ABSTRACT

A memory controller is provided that includes a host system interface that receives requests from applications and sends read or write commands to a disk for data retrieval. A threadlet core provides threadlets to the host system interface that enable the host system interface to use a logical bit address that can be sent to a memory device for execution without having to read and write entire blocks to and from the memory device.

23 Claims, 4 Drawing Sheets

EXPORTING COMPUTATIONAL CAPABILITIES INTO A BLOCK-ORIENTED DISK MEMORY

PRIORITY INFORMATION

This application claims priority from provisional application Ser. No. 61/906,067 filed Nov. 19, 2013, which is incorporated herein by reference in its entirety.

BACKGROUND OF THE INVENTION

The invention is related to the field of memory processors, and in particular to exporting computational capabilities into a block-oriented disk memory.

A key component of most modern computing systems is a disk—a device that can store large amounts of data in a compact format, but that can access such data only in relatively large blocks. Current devices fall in at least two categories: (1) rotating hard drives where a magnetic medium is spun underneath a read/write head, and (2) a solid state drives (SSD) constructed primarily from "flash" chips that store data as charge in semi-conductor devices. In both cases, access is on a "block" basis: a read or write request must handle some integral number of blocks, each of a size of a few hundred to a few thousand bits at a time.

For any data access to the entirety of a large data object such as a file that might scale into the gigabyte range, this blocking is at best just an inconvenience. However, any request that wishes to access only a few bits to different "random" locations in the object must still access a minimum of a whole block, and if those bits must be modified, the modification must be done to a copy of the block outside of the device, and then sent back in. For example, to modify a 32 bit entity within a 4096 bit block the device must read out 4096 bits and then accept 4096 bits in return. The time to transfer this 8192 bits over the interface to the disk is 256 time longer than to transfer the 32 bits that have to change.

Even worse, if different parts of the same block may in any way be subject to simultaneous updates from several different processes external to the disk, every single one of these updates must perform this double block transfer, with some additional (and perhaps quite complex) locking and/or synchronization to prevent some of the updates from being lost.

The net result is that many non-sequential accesses to small amounts of data can have an extraordinarily deleterious effect on the disk's performance. As we move towards big data problems where such non-uniform accesses become more and more common, the inability to do anything other than read and write relatively large blocks of data is rapidly becoming the overall bottleneck to increasing performance, regardless of how much external processing is available.

SUMMARY OF THE INVENTION

According to one aspect of the invention, there is provided a memory controller. The memory controller includes a host system interface that receives requests from applications and sends read or write commands to a disk for data retrieval. A threadlet core provides threadlets to the host system interface that enable the host system interface to use a logical bit address that can be sent to a memory device for execution without having to read and write entire blocks to and from the memory device.

According to another aspect of the invention, there is provided a method of controlling commands sent to a memory. The method includes receiving requests from applications to send read or write commands to a disk for data retrieval using a host system interface. Also, the method includes generating threadlets to the host system interface using a threadlet core that enable the host system interface to use a selective number of bits that can be sent to a memory device for execution without having to read and write entire blocks to and from the memory device.

According to another aspect of the invention, there is provided a method of performing the operations of a memory device. The method includes constructing a threadlet and providing an offset to a location where initial threadlet processing is to be performed. Also, the method includes computing matching logical bit address (LBA) within the memory device, and assembling and sending the threadlet to the memory device. The threadlet is placed in a queue for execution while dequeueing a previously executed threadlet. Moreover, the method includes determining if a block of data is in a second memory device and executing the commands of the queued threadlets, and if the block of data is not in the second memory device suspending and enqueing a command to read the block of data.

DETAILED DESCRIPTION OF THE INVENTION

Figure 1:
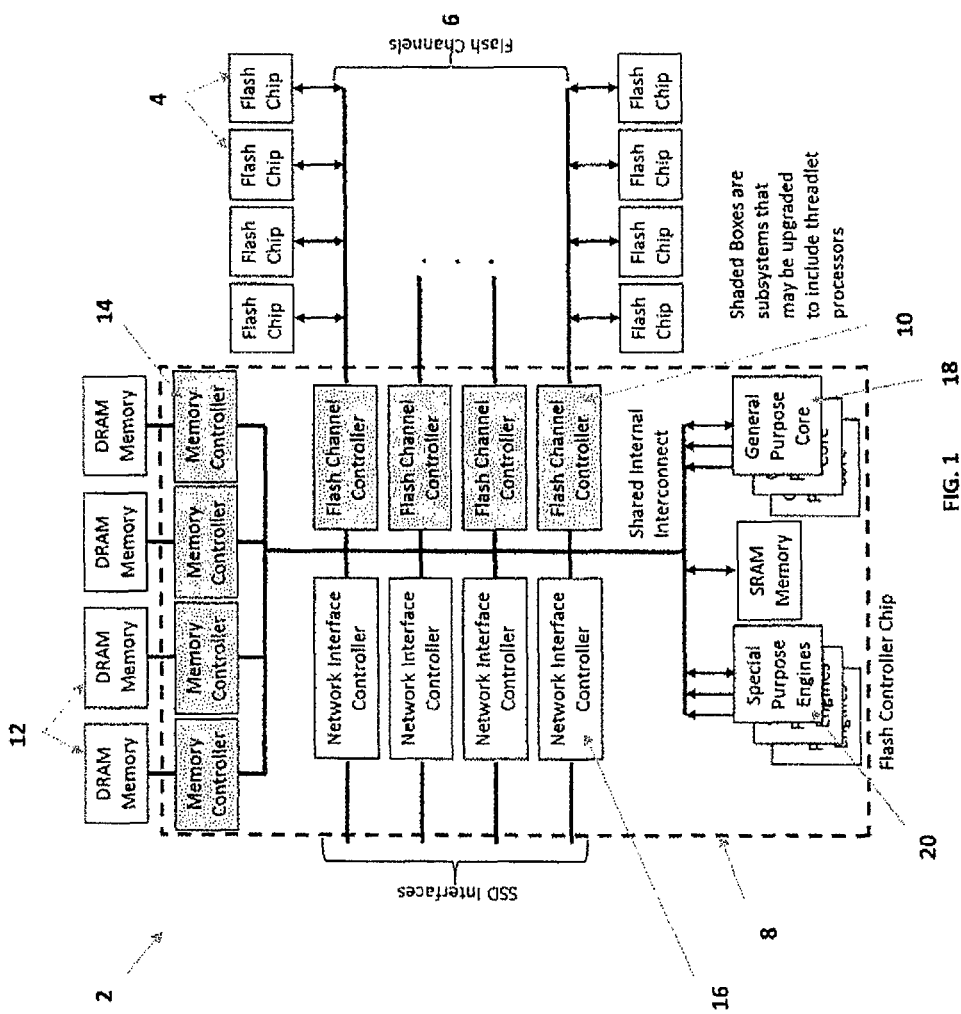
FIG. 1 is a schematic diagram illustrating the internal architecture of a SSD 2 using flash memory chips 4 for storage used in accordance with the invention.

This invention addresses a system where the concept of a mobile thread is implemented into a disk's controller function so that a short program to access (read, write, or modify) a small number of bits can be sent into the disk for execution there, without having to read and write entire blocks to and from the device. The result is higher useful bandwidth on the interface between the device and the rest of the computing system, and significantly reduced complexity when multiple such modifications may in fact be applied at the same time to data in the same block.

A "disk" is the notional term for a system with a very large amount of memory capacity from which relatively large amounts of information, termed "blocks," can be read or written at a time, and where "relatively large" is in relation to the size of data read or written by a typical individual computer instruction inside a processor. Today the latter is likely to be 8 bytes whereas the former is 512 bytes or larger.

Current implementation technologies for such disks range from rotating medium where data is sensed magnetically or optically, to solid state disks (SSDs) constructed from what are called NAND Flash chips, where data is stored as small amounts of charge on the gates of transistors arrayed in long strings. Technologies in the near future may use other storage media other than flash, such as Magnetic RAM (MRAM) or Phase Change Memory (PCM).

In terms of capacity such disks today can hold up to terabytes (where 1 terabyte=1 million million bytes) of data, whereas the typical main memory of a modern processor, constructed from DRAM chips, is a few gigabytes (where a gigabyte is $1/1000^{th}$ of a terabyte).

In addition, the time to access such blocks in a disk is considerably larger than the time to access DRAM—up to milliseconds (ms) for magnetic disks, or about 25 microseconds (µs) for a NAND flash, versus perhaps 100 nanoseconds (ns) for DRAM.

An example of a modern SSD is the Micron RealSSD™ P320h Enterprise PCIe Solid State Drive [Micron]. This device has a PCI Express interface over which commands can be sent to the device, and data may be transferred, and supports 512 byte (4096 bit) blocks.

The PCI Express protocol used by this device includes an address and a variety of command fields which, when used in a command packet, is interpreted by the SSD's controller to perform read and write functions. Together such a packet specifies a block to access and what kind of access to perform (read or write). Depending on the controller, it may be possible to specify "partial block" transfers that are less than a whole block, but internal to the drive such accesses are first translated into full block accesses.

Today a typical disk interface associates different physical blocks of memory within the disk device with "Logical Block Addresses" (LBA). The computer communicating with a disk (to be termed for the rest of this paper as a "host" processor) thus must convert all requests from "file name "offset" into common LBA block addresses relevant to the disk, and then the disk's internal controllers must translate each LBA to a unique physical block within the device's storage. This mapping need not be sequential. Currently, a relatively standard block size for many disk technologies is 512 bytes.

The conventional use of such disks is to hold potentially large numbers of possibly quite large "data files," where each file is a sequentially ordered set of data bytes, as seen by the user. While the logical length of a file may be anything, the physical length must be an integral number of blocks, with the block size dependent on the underlying technology and controller.

In addition, sequential blocks associated with a particular file may not be "sequential" in terms of the blocks as stored in the disk. It is up to the computer's operating system, using "directory" information, to determine in what LBA on a device is a desired part of a file.

A type of tile of direct relevance to this invention is a "swap file." Such a file actually contains the overall contents of the host processor's memory for a particular application, termed its "virtual memory." Depending on the application, this may be very much larger than the physical DRAM memory that may be actually addressable by instructions executing in the host processor. A "virtual memory translation" mechanism implemented in the processor then takes addresses generated by program instructions into the virtual memory and determines in which physical "page" of DRAM memory this virtual address lies. If the "virtual page" does not currently correspond to any DRAM page, the processor's operating system will determine which disk holds the swap file, and what are the LBAs into that swap file to which the current contents of the page map, and then request the associated LBA blocks from the disks holding the swap file.

If there is no room in the DRAM currently allocated to the application for the incoming blocks, it may be necessary to make room by moving some virtual page from DRAM back to its location in the swap file, especially if it has been modified over the original values in the swap file. This requires computing the matching LBAs for the swap file blocks for the outgoing page, and writing the data back to the disk at those LBAs.

FIG. 1 is a schematic diagram illustrating the internal architecture of a SSD 2 using flash memory chips 4 for storage used in accordance with the invention. SSDs 2 for other technologies are similar in architecture. Sets of these flash chips 4 are connected in parallel on Flash Memory Channels 6. Multiple channels 6 and flash chip 4 sets may be present in a single SSD, with each channel capable of independent operation.

The functions inside the dotted box 8 are often integrated into a single custom "SSD Controller" logic chip 8 and include a separate "Flash Channel Controller" 10 for each Flash Channel 6 to govern operations on that channel and control data transfers between the channel and other memories in the SSD. A number of typically DRAM memories 12, have DRAM chips 10 external to the SSD controller, and "DRAM Memory Controllers" 14 lie within the SSD controller 8. These memories are typically used to cache recently accessed blocks from the disk. Network Interface Controllers (NICs) 16 can govern the transfer of data and commands between the SSD and outside processors over the off-SSD interfaces such as PCI Express.

Figure 2:
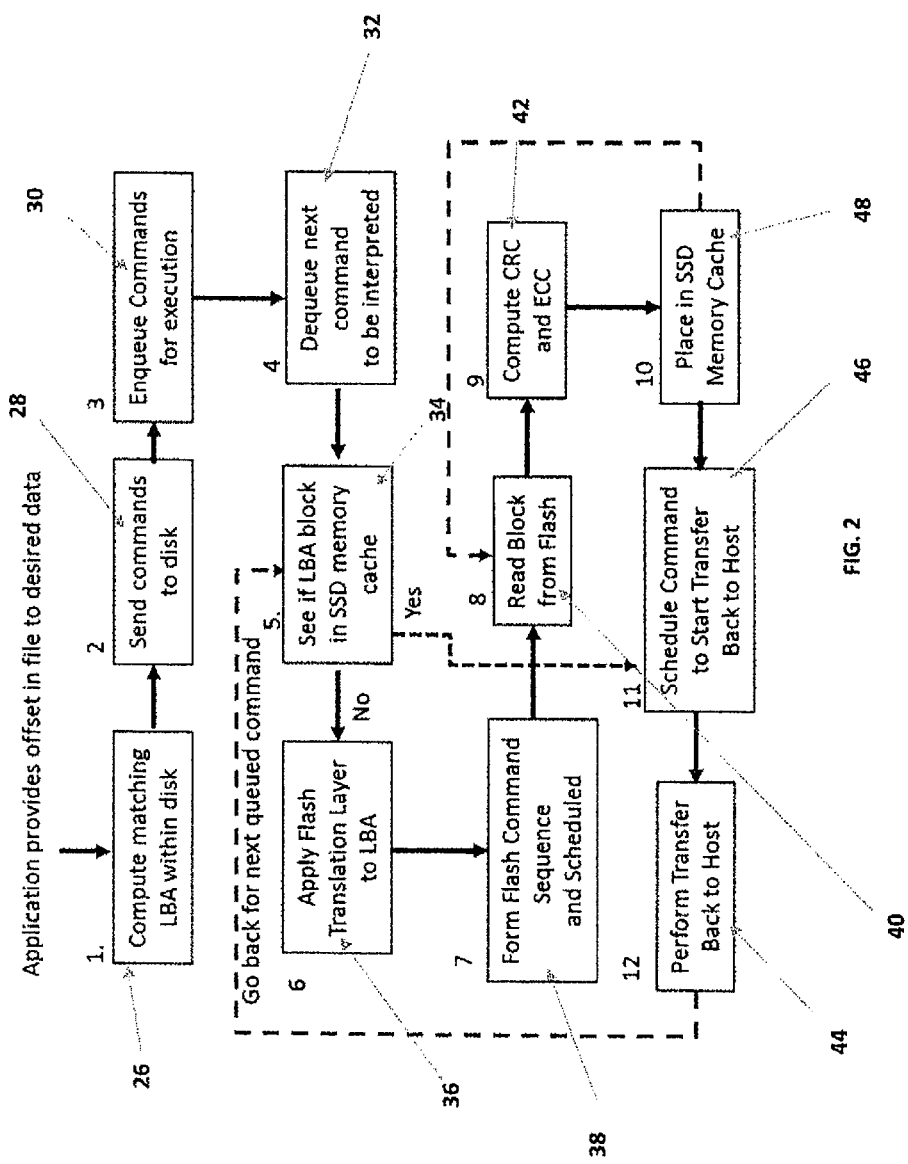
FIG. 2 is a schematic diagram illustrating the processing flow from the time a program in a host processor determines it needs to read some information from a file.

A number of General Purpose Cores 18 are used that are small processors of conventional design capable of executing the programming needed to interpret and run an SSD. Some number of Special Purpose Engines 20 are capable of handling compute-intensive operations such as computing and checking Error Correcting Codes on blocks of data going to or from the flash chips 4. Internal memory is used for temporarily by the various other systems. A Shared Internal Interconnect allows all these units to exchange data and commands with each other. This may be either one or more busses or some sort of on on-chip interconnection network FIG. 2 shows a notional processing flow 24 from the time a program in a host processor determines it needs to read some information from a file (either as an explicit access to a data file or as a virtual memory translation trap) until the time the data from the disk is back in memory. A program in the host determines from the data required which disk the data resides on and what LBA(s) within that disk contains the data, as shown in step 26. A set of commands is created and sent to the disk to perform the desired access, as shown in step 28. Within the disk the commands may be enqueued until the disk can execute them, as shown in step 30. This enqueing may be on the external DRAM or in some memory within the controller. Commands are dequeued and interpreted in some order, as shown in step 32.

The LBA specified by an individual command is checked against the LBAs associated with blocks cached in the controller, typically in the off-controller DRAM memory, as shown in step 34. This address tag checking may be done either in hardware (as in the memory controllers) or by programs running in a general purpose core in the controller. If the desired block is found, processing continues at step 46; otherwise step 36.

If the specified blocks are not cached, then the LBAs are translated to specifications as to which blocks in which flash chips on which flash channels, as shown in step 38. This process is commonly referred to in the literature as "FTL"—Flash Translation Layer. The commands to access the desired flash blocks are created and scheduled for execution by the appropriate flash controllers, as shown in step 40. CRC (Cyclic Redundancy Checks) and ECC (Error Checking Codes) is performed on the data to remove data errors, as shown in step 42. This may often be done by special purpose engines in the controller. The corrected data is placed in the SSD cache, as shown in step 48. A block as read from a flash chip is often bigger than a block as requested from a host, so there may be additional LBA blocks placed in the memory cache that may prove useful later if the host later requests additional nearby blocks. Commands are created and scheduled to transfer the requested data back to the host, as shown in steps 46 and 44. These commands are executed by the Network Interface Controllers to perform the transfers out of the SSD.

Writing data back to the disk from a host is separate but similar. Unless otherwise specified, the above actions are typically performed by a program running on a general purpose core in the controller. As enqueued commands from the host are completed, other commands from the host are dequeued and started. It is possible to reverse steps 32 and 34, and cache blocks not on LBAs but on flash block addresses as determined by the FTL process 34.

Much of the original implementation of the above technology was developed at a time when there is typically only a single thread from a single program running at a time in the host. Simple multi-programming—switching the processor to run a different application—was able to overlap times when one program had to wait for the disk to respond with a page from the program's swap file that the application needed.

Current multi-socket multi-core systems running multi-threaded applications have complicated all of this. Such systems allow applications where possibly hundreds of concurrent threads may be running as part of the same application at the same time, all sharing the same virtual address space. Clearly this increases the demand for pages from the virtual memory system, especially as different threads access different pages. There is also likely to be an increased need for prematurely flushing modified pages back to the swap file to make room for the newly requested pages. In addition, synchronization between threads requires atomic operations on synchronization variables in memory, which in traditional architectures requires a great deal of cache coherency operations to ensure proper operation.

The net effect is a significant growth in disk to processor traffic associated with pages where only a small amount of the data is referenced and modified before the page has to be bounced back to the swap file.

Shared memory multi-threaded programs are not the only type of applications that are subject to such performance hits. With the advent of large transactional database systems, and more recently "Big Data" analytics applications, there are more and more applications where multiple distinct programs will want to share the same files(s) at the same time, and hit the same kinds of limits as above, where there is a huge amount of page traffic between disks and processor to transfer blocks of which only a very small part are referenced or modified. Examples of this include updates to individual records within a database in a shared file. Locks are set on an object by object basis within the file. Data is accessed in an indirect fashion within a data structure stored within a disk. This is of particular use for structures such as sparse matrices or large graphs. Search functions may wish to locate some record(s) that satisfy some often simple tests within a large database stored within a file. Without the ability to make the test in situ, the entire data set may have to be read out of the device and transferred to the host.

The approach taken in by the prior art is oriented towards using SSD-like devices to enable larger working sets than can fit in main memory for data-intensive applications by greatly streamlining the process of determining which block(s) to transfer between where on disk and host memory, but does little to avoid the need to actually transfer data.

While modem SSDs, especially using flash memory, have greatly increased the bandwidth and latency of disks for the above applications, the processing side is growing far faster than the interface bandwidth. What is needed is a mechanism to avoid much of the low efficiency traffic from appearing on the interface by performing computation within the disk system. Doing so has the advantageous side-effect of also reducing the pressure on what DRAM memory is available within the processor by eliminating the need to store low-lifetime or sparsely referenced pages.

Figure 3:
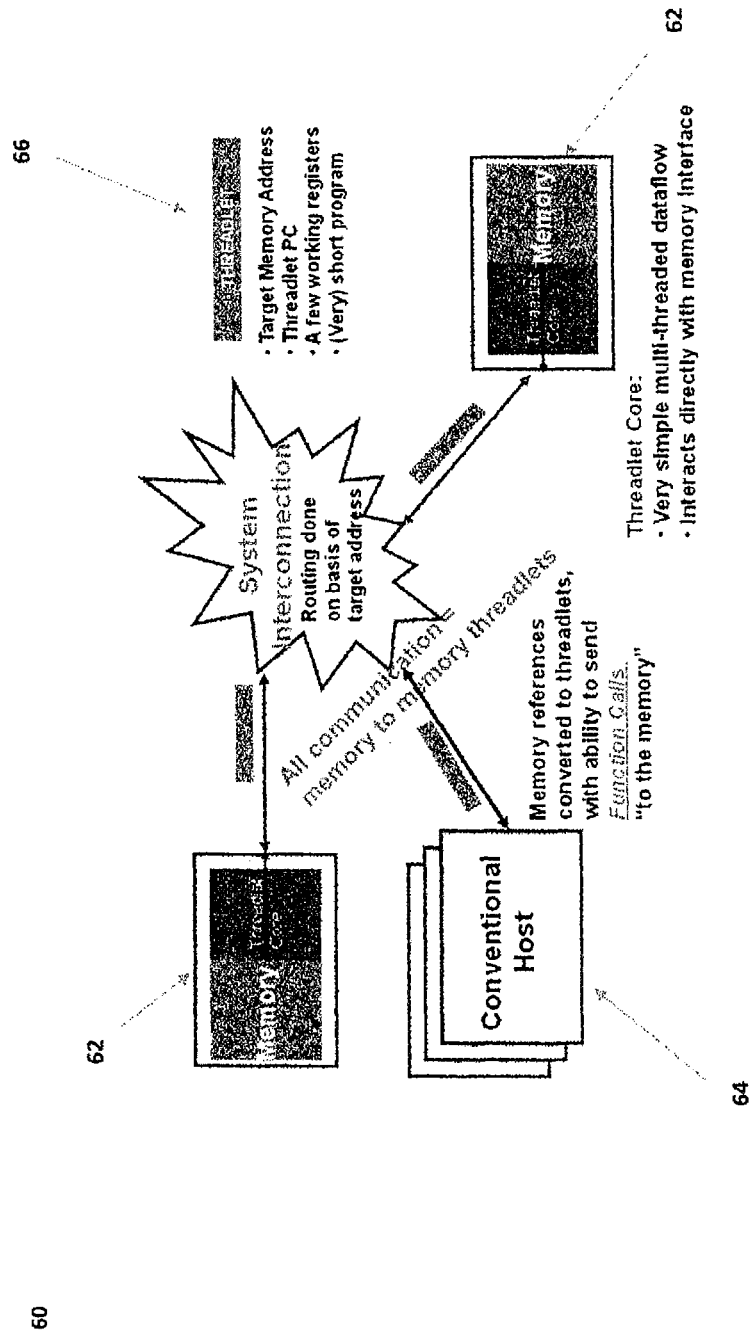
FIG. 3 is a schematic diagram illustrating a system with a multiplicity of memory nodes that defines a threadlet to extend a memory read or write interface to those nodes.

FIG. 3 show a mobile programming platform of that defines a mechanism (termed a "threadlet") 66 to extend a memory read or write interface. The invention includes a conventional host 64 embodied, such as PCI Express, where short functions can be embedded into a memory request, and executed at the memory interface by a very simple processing core (termed a "Threadlet core" in FIG. 3—existing implementations require less logic than needed for the memory controller for conventional DRAM memory). FIG. 3 also indicates that multiple memory subsystems 62 may be integrated together to provide more capacity as seen by the host.

These threadlet functions can not only implement data transfers (reads and write) and sequences of computations, but also atomic operations, where an update to some addressed field within a block is performed inside the device, with a guarantee that the read-compute-write required for the update can be done in a way where there is a guaranteed no possible interference from other updates to the same or nearby fields. In addition, the referenced invention also permits such threadlets to spawn other threadlets that may execute against the same or other regions, independent of the parent threadlets. Finally, this same thread of execution carried by these threadlets may change the focus of its operation, permitting movement to a different address and performance of other functions as required, all without having to return to the host until the computation is complete.

Examples of threadlet programs useful for execution on such devices include:
  Simple modifications to small fields within a file, such as updating a record in a database file.
  Operations to locations in a swap file that correspond to atomic operations into an application's virtual memory for synchronization or locking between multiple threads on the host processor.
  Searching a linear array for an entry that matches, especially as in an index file for a database, or as a search in a flat database where the fields to be tested in each record do not take up the whole record.
  Searching a more complex structure such as a B-tree on disk, where once one vertex in the B-tree has been touched, there may be several other entries randomly located in the B-tree to be looked at, potentially in parallel by spawned child threadlets.
  Searching for, and then updating, a record in place.
  Doing any of the above in a system where the data is kept on the disk in encrypted form, and should not leave the disk unencrypted.
  Traversing graphs where edge lists (lists of pointers to other vertices in the graph) are kept in disk files and point to other vertices with other edge lists.

The ability for a threadlet to migrate its point of execution based on address, and to quickly and naturally spawn other threadlets distinguish it from other technologies such as Java applets.

The invention proposes mechanisms for inclusion of threadlet technology within a disk and especially within an SSD using technology such as flash chips. This inclusion starts with adding to the host's programming the ability to send not just read or write commands to a disk but threadlet packages that have within them the following: (1) an indication that this is a threadlet and not a conventional command; (2) an address, typically based on an LBA for compatibility with conventional disk reads and writes, that points to data within the SSD against which some function is to be initially performed; (3) the function to be performed against that address. The code defining this function's actions may accompany the threadlet, or be prestored in the SSD, or both; (4) operands to be used by the threadlet in the computation; and (5) Information as to how to communicate back to the host upon completion. In most cases such information may simply be part of the operand set provided by the host, as in a host address to which completion data can be written.

Figure 4:
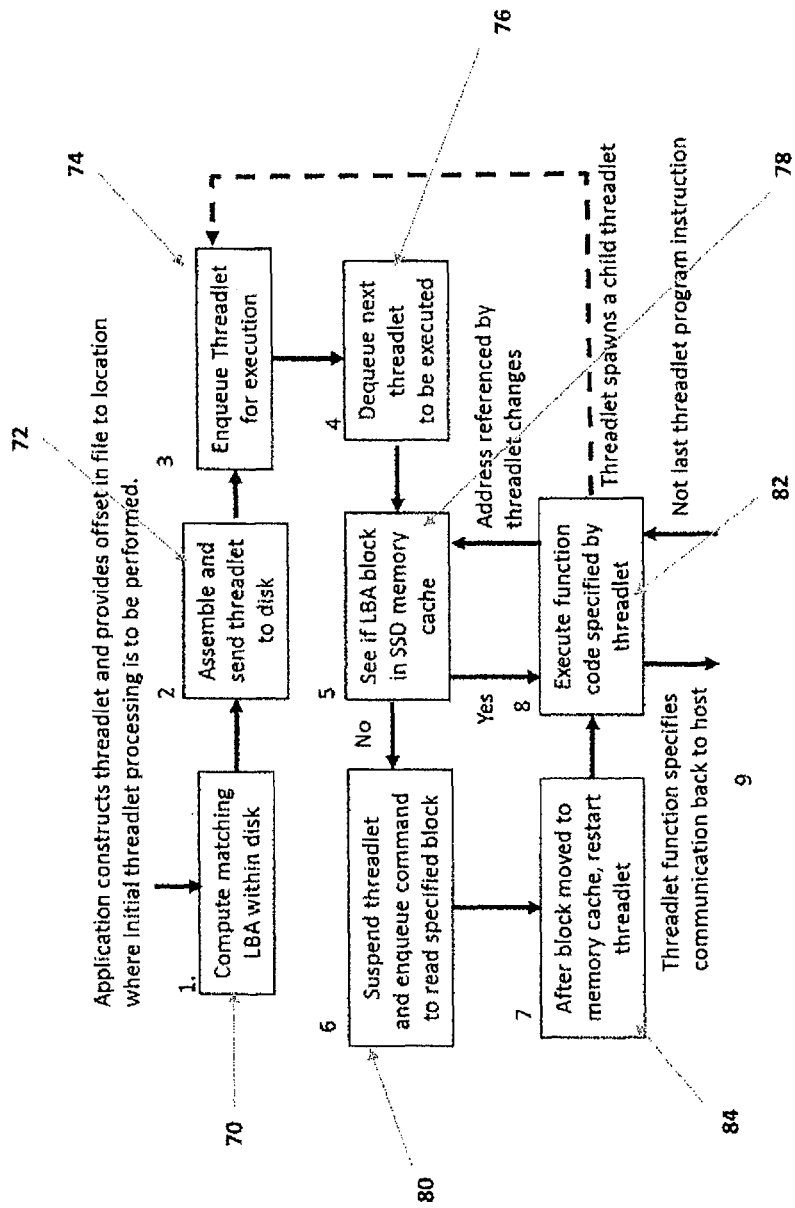
FIG. 4 is a schematic diagram illustrating the processing flow for threadlets running within an SSD.

Note threadlets permit standard libraries to be loaded into the SSD in advanced and then chained together as desired by code accompanying the threadlet. This latter allows "one time" operations to be sent over without the complexity of creating and managing a library of functions on the disk FIG. 4 is a schematic diagram illustrating the processing flow for threadlets running within an SSD. As with a normal disk read or write, a program in the host determines that some processing is to be done starting at some location in a file, and computes the LBA for that location within the disk holding the file, as shown in step 70. The other parts of the threadlet (operands and code) are assembled and sent along with the LBA to the disk, as shown in step 72. At the disk side the command is enqueued until it is possible to start it, as shown in step 74. Depending on implementation, this queue can be the same as for other disk commands or may be a separate one for threadlets. When resources are available to start the threadlet, it is dequeued and its execution is started, as shown in step 76. This execution begins with the first instruction specified as part of the threadlet's code, as shown in step 82. Once the threadlet's program reaches an instruction where a memory reference is to be made, initially using the supplied LBA, a check is made if the specified block is in the disk's memory cache, as shown in step 78. If the specified block is not present, the threadlet is suspended and a flash read command sequence is enqueued to read the specified block, as shown in step 80.

If the threadlet's code computes a new address that is not in the same LBA, a repeat of step 78 is performed. If the threadlet spawns a child threadlet to pursue an independent execution, either the child or the parent is enqueued as in step 74, and the other threadlet continues execution. If the threadlet reaches an instruction signaling a communication back to the host, the appropriate command and associated data is enqueued internally as in step 30 of FIG. 2. If the threadlet reaches a point where its execution is complete, its resources are surrendered and given to the next threadlet, as in step 76.

There are at least two approaches to implementing the processing associated with a threadlet. First is in hardware via a small processing core integrated with the various memory controllers within the SSD. In these cases, a NIC would identify that an incoming packet from a host is a threadlet rather than a conventional command, and send the threadlet initially to the threadlet core in the appropriate memory controller for the internal disk cache.

The second approach is via software whereby the original threadlet is enqueued as any other command. When the threadlet is dequeued, the program in the general purpose core that interprets commands from the host recognizes that this is a threadlet, and starts up a "threadlet emulator" that finds the associated code for the threadlet and performs all the operations that a hardware implementation might perform, but at a slower rate. Such an emulator is no different in general structure from any other emulator, such as a Java Virtual Machine where Java bytecode programs are executed by a program in a way that derives the same results that would have been achieved if a hardware JVM core had been built.

It should be noted that this slower software implementation approach may be perfectly adequate for at least current SSDs since the access time for data from flash chips today is often 25 μsec or longer, and even a simple core running at a GHz could emulate thousands of threadlet instructions in that time frame.

It is also possible for implementations to do a mix of both, with the hardware implementation used as long as the desired data is in the disk cache, and software emulation used when the desired data is in flash.

Other options in implementation are also possible. If, for example, the flash memory controllers of FIG. 1 buffer flash blocks as they are read from the flash chips, it is also feasible to include a threadlet core in or near the flash controller, so that threadlet execution can be performed directly against the flash buffer, before it is transferred to the memory buffer.

It is also an implementation option in systems that hold multiple memory channels, either for DRAM or flash, to have multiple threadlet cores, and allow individual threadlets to migrate between memory controllers as necessary as their programs compute new addresses.

In cases where interfaces such as PCI Express are used where both ends of an interface can originate messages and use a common address space to identify the destination, it is also possible to create systems where there are multiple host systems, multiple threadlet-enhanced disks, and perhaps additional nodes of pure conventional memory with threadlet cores embedded in them. Multiple PCI Express links off of each disk, and/or commonly available PCI Express routers, then allow complex systems such as FIG. 3 to be constructed, where threadlets may not only migrate within a single disk but migrate freely between disks or memory nodes. This requires a LBA address space for a single disk to be subsetted into a larger address space that can distinguish between the LBAs for different disks, but this is the kind of subsetting for which networking protocols such as PCI Express was designed.

The net effect is that with threadlet technology it is possible to now write functions that are executed by threadlets regardless of where the associated data resides, without the function having to be aware that the actual data resides on potentially different disks or storage media.

Other link protocols such as Hypertransport™ have properties similar to PCI Express that would make them likewise usable.

The invention described here enables a program running in a conventional processor to execute a piece of code against some locations within a file that is present on an attached disk drive without having to have the associated pieces of the file transported from the disk to the host, and back again. This can profoundly reduce the traffic between the host and the disk, allowing the now freed bandwidth to be used by host applications that really need host access to file data.

Although the present invention has been shown and described with respect to several preferred embodiments thereof, various changes, omissions and additions to the form and detail thereof, may be made therein, without departing from the spirit and scope of the invention.

What is claimed is:

1. A memory controller comprising:
 a host system interface that receives requests from applications and sends read or write commands to a disk for data retrieval; and
 a threadlet core that provides threadlets to the host system interface that enable the host system interface to use a logical bit address that can be sent to a memory device for execution without having to read and write entire blocks to and from the memory device.

2. The memory controller of claim 1, wherein the host system interface comprise PCI Express.

3. The memory controller of claim 1, wherein the memory device comprises a flash drive.

4. The memory controller of claim 1, wherein the threadlets comprise an indication that a threadlet is not a conventional command.

5. The memory controller of claim 1, wherein the threadlets comprise an address, typically based on an LBA for compatibility with conventional disk reads and writes, that points to data within a flash drive against which some function is to be initially performed.

6. The memory controller of claim 1, wherein the threadlets comprise information as to how to communicate back to the host system interface upon completion.

7. The memory controller of claim 1, wherein the threadlets perform atomic operations, where an update to some addressed field within a block is performed inside the memory device, with a guarantee there is no possible interference from other updates to the same or nearby fields.

8. The memory controller of claim 1, wherein the threadlets spawn other threadlets that execute against the same or other regions of the memory device, independent of the parent threadlets.

9. The memory controller of claim 1, wherein the threadlets are executed within a flash drive.

10. The memory controller of claim 1, wherein the threadlets are executed regardless of where the associated data resides on different disks or storage media.

11. A method of controlling commands sent to a memory device comprising:
receiving requests from applications to send read or write commands to a disk for data retrieval using a host system interface; and
generating threadlets to the host system interface using a threadlet core that enable the host system interface to use a selective number of bits that can be sent to a memory device for execution without having to read and write entire blocks to and from the memory device.

12. The method of claim 11, wherein the host system interface comprise PCI Express.

13. The method of claim 11, wherein the memory device comprises a flash drive.

14. The method of claim 11, wherein the threadlets comprise an indication that a threadlet is not a conventional command.

15. The method of claim 11. wherein the threadlets comprise an address, typically based on an LBA for compatibility with conventional disk reads and writes, that points to data within a flash drive against which some function is to be initially performed.

16. The method of claim 11, wherein the threadlets comprise information as to how to communicate back to the host system interface upon completion.

17. The method of claim 11, wherein the threadlets perform atomic operations, where an update to some addressed field within a block is performed inside the memory device, with a guarantee there is no possible interference from other updates to the same or nearby fields.

18. The method of claim 11, wherein the threadlets spawn other threadlets that execute against the same or other regions of the memory device, independent of the parent threadlets.

19. The method of claim 11, wherein the threadlets are executed within a flash drive.

20. The method of claim 11, wherein the threadlets are executed regardless of where the associated data resides on different disks or storage media.

21. A method of performing the operations of a memory device comprising:
constructing a threadlet and providing an offset to a location where initial threadlet processing is to be performed;
computing matching logical bit address (LBA) within the memory device;
assembling and sending the threadlet to the memory device;
placing the threadlet in a queue for execution while dequeueing a previously executed threadlet;
determining if a block of data is in a second memory device and executing the commands of the queued threadlets, and if the block of data is not in the second memory device suspending and enqueing a command to read the block of data.

22. The method of claim 21, wherein the threadlets are executed using a network interface controller (NIC).

23. The method of claim 22, wherein the NIC identifies if an incoming packet from a host s a threadlet rather than a conventional command, and sends the threadlet to a threadlet core for execution.

* * * * *